WILLIAM STEFFE.

Improvement in Radiators.

No. 4,401. Reissued May 30, 1871.

Witnesses. Thos. A. Brutt, Wm. R. Wright

Inventor. William Steffe

AM. PHOTO-LITHOGRAPHIC CO. N.Y. (OSBORNE'S PROCESS.)

UNITED STATES PATENT OFFICE.

WILLIAM STEFFE, OF PHILADELPHIA, PENNSYLVANIA, ASSIGNOR TO HIMSELF AND JESSE REYNOLDS, OF SAME PLACE.

IMPROVEMENT IN RADIATORS.

Specification forming part of Letters Patent No. 80,883, dated August 11, 1868; reissue No. 4,401, dated May 30, 1871.

*To all whom it may concern:*

Be it known that I, WILLIAM STEFFE, of the city and county of Philadelphia, in the State of Pennsylvania, did invent a certain new and useful Improvement in Drums or Radiators for Air-Heaters; and I do hereby declare the following to be a full, clear, and exact description thereof, which will enable others skilled in the art to which it appertains to make and use my invention, reference being had to the accompanying drawing which forms a part of this specification, and in which—

Figure 1:
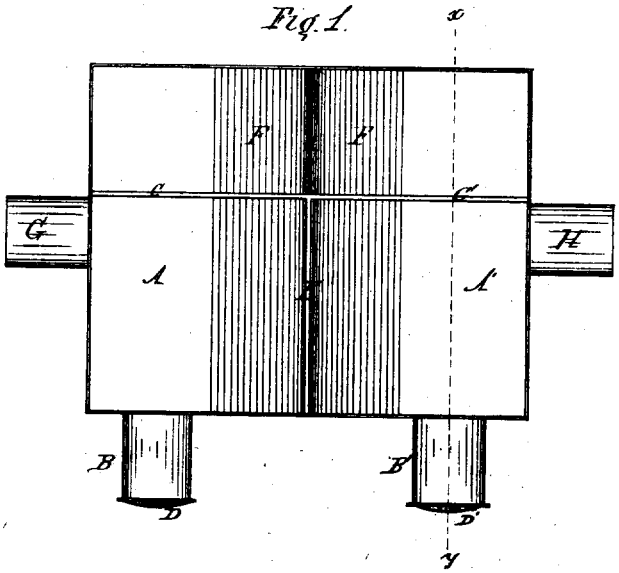
Figure 2:
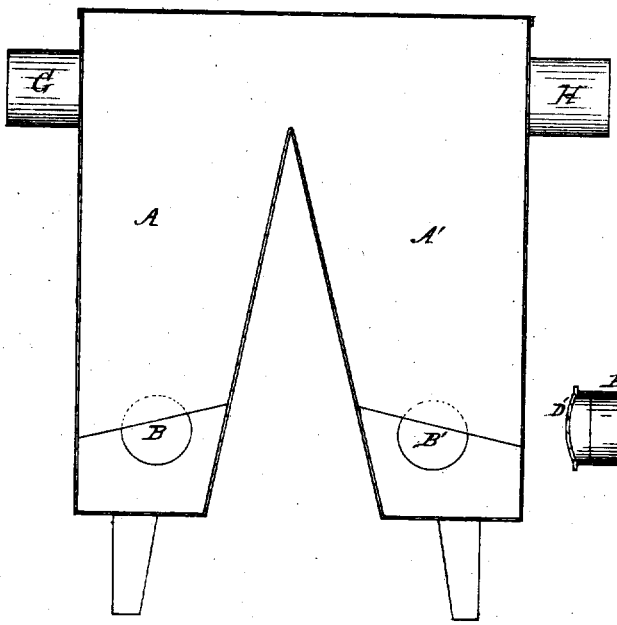
Figure 3:
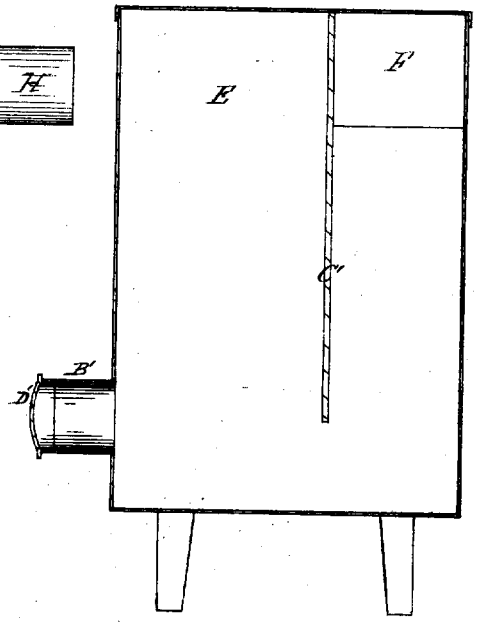

Figure 1 is a plan or top view of my improvement, with the cap or top plate removed; Fig. 2 is a side view thereof, with one of the side plates removed; and Fig. 3, a vertical transverse section taken on the line *x y*, Fig. 1.

The same parts are denoted by the same letters in all the figures.

This invention relates to that class of drums or radiators which are used in the air-chambers of heaters, into which they radiate the heat received from the hot air and products of combustion which pass through them.

As now generally made, these drums have to be removed from the chamber to be cleaned at least once a year, and, when bituminous coal is the fuel, much oftener. If this is not done the drums will rust out. The operation of removal and cleaning requires skill and is expensive.

In order to obviate these objections I construct my improved radiators so that they shall be permanently fixed in the air-chamber.

A A′ in the drawing represent the two radiators which compose my improvement. These radiators are made of heavy plate or wrought iron, well riveted together, thereby preventing the opening of the seams by expansion and contraction, and consequent emission of gas or smoke. Access to the interior of the radiator is given by the pipes or openings B B′, which pass through the brick wall, and are provided with tight doors or covers D D′ on the outside of the brick-work. By means of these pipes the radiators may be thoroughly cleaned without removing them from the chamber, or in any manner disturbing them. This can be done by any person of ordinary intelligence as often as may be required. In order to convey as much heat as possible from the products of combustion to every portion of the radiating surface, and to retard their passage through and from the radiator so as to utilize their heat to the utmost extent, I divide each of the radiators by vertical partitions C C′, which extend from the top to within a short distance of the bottom of each radiator, and, while partially separating them, as, by the partition E, I connect them by a transverse passage, F, so arranging all the partitions with relation to the pipe G, which connects the radiator with the furnace and to the exit-pipe H, that the entering products of combustion shall pass down one side of the radiator A, then under the partition C, up the other side of the radiator, then through the transverse passage to the radiator A′, descend on one side of A′, then under the partition C′, ascend on the other side of A′, and escape through the exit-pipe H.

The doors or covers D D′, on the outside of the chamber, may be used to check the draft of the heater by opening them for the admission of external air.

What I claim as my invention, and desire to secure by Letters Patent of the United States, is—

The compound radiator, consisting of the permanent wrought-iron radiators A A′, constructed with the cleaning-out passage B B′ at the bottom of each radiator, whereby the necessity of removing the radiators is obviated, and also with vertical partitions C C in each radiator, respectively, and with a transverse passage at F between the radiators, so arranged as to cause the products of combustion to circulate, substantially as described.

WILLIAM STEFFE.

Witnesses:
LEWIS GODLOVE,
GEORGE W. TAYLOR.